United States Patent [19]
Matsuda

[11] Patent Number: 5,224,765
[45] Date of Patent: Jul. 6, 1993

[54] CONTROL SYSTEM FOR DISTRIBUTING BRAKING FORCES APPLIED TO LEFT AND RIGHT WHEELS IN AUTOMOTIVE VEHICLES

[75] Inventor: Toshiro Matsuda, Sagamihara, Japan

[73] Assignee: Nissan Motor Co., Ltd., Yokohama, Japan

[21] Appl. No.: 802,297

[22] Filed: Dec. 4, 1991

[30] Foreign Application Priority Data

Dec. 21, 1990 [JP] Japan .................. 2-412733

[51] Int. Cl.$^5$ .............................................. B60T 13/06
[52] U.S. Cl. .................................. 303/9.62; 303/9.67; 303/113.4; 180/197
[58] Field of Search ................ 303/9.62, 9.67, 9.71, 303/9.73, 100, 111, 113 AP; 180/197

[56] References Cited

U.S. PATENT DOCUMENTS

| 4,809,181 | 2/1989 | Ito et al. ........................ 303/100 |
| 4,836,618 | 6/1989 | Wakata et al. ................. 303/100 |
| 5,015,041 | 5/1991 | Kuwana et al. ................ 303/100 |

FOREIGN PATENT DOCUMENTS 0238554 10/1986 Japan .
0237252 9/1989 Japan .................. 303/100
0151556 6/1990 Japan .................. 303/100

*Primary Examiner*—Matthew C. Graham
*Assistant Examiner*—Chris Schwartz
*Attorney, Agent, or Firm*—Foley & Lardner

[57] ABSTRACT

A control system for distributing braking forces applied to left and right wheels in an automotive vehicle, comprises two fluid pressure control valves, normally controlling a left-wheel brake fluid pressure distribution between front and rear-left wheels and a right-wheel brake fluid pressure distribution between front and rear-right wheels such that a rear-wheel brake fluid pressure is less than a front-wheel brake fluid pressure in a range above a respective critical fluid pressure at which the brake fluid pressure distribution between front and rear wheels is essentially varied, a lateral acceleration sensor for monitoring a degree of turn of the vehicle, and a set of reversible motors and return springs employed in each fluid pressure control valve for varying the respective critical fluid pressures independently of each other depending on the degree of turning such that the critical fluid pressure of the outer-wheel side is set at a higher level than the critical fluid pressure of the inner-wheel side.

9 Claims, 3 Drawing Sheets

CONTROL SYSTEM FOR DISTRIBUTING BRAKING FORCES APPLIED TO LEFT AND RIGHT WHEELS IN AUTOMOTIVE VEHICLES

BACKGROUND OF THE INVENTION

1. Field of the Invention

The present invention relates to a control system for distributing braking forces applied to left and right vehicle wheels so as to prevent the vehicle from moving along an unacceptable turning locus when the vehicle is turned to the right or left.

2. Description of the Background Art

As is generally known, hydraulic type brake systems use the pressure of a working fluid (brake fluid) to force the brake shoes against the brake drums or disk. In such traditional hydraulic brake systems, brake fluid pressure is forced through a master cylinder to each wheel-cylinder in proportion to a depressing force exerted on a brake pedal and as a result each vehicle wheel is braked. During braking, more of the car weight is transferred to the front wheels and thus the car weight becomes less at the rear wheels. If normal braking were continued with the front-wheel brake fluid pressure equal to the rear-wheel brake fluid pressure, the brakes could first lock the rear wheels so that the rear tires skid. As a result, the rear wheels could throw the entire car into a rear-end skid. This could result in oversteer and/or spinning on wet or icy roads. As is well known, it is advantageous to provide a braking action according to which front wheel lock gets priority over rear wheel lock so as to prevent oversteer tendencies on turns. As indicated by a broken line in FIG. 5, it is desired that both front and rear wheel brake fluid pressures are varied in accordance with an ideal brake fluid pressure distribution characteristic curve wherein both front and rear wheels are locked simultaneously so as to provide an optimal braking efficiency.

In view of the above, as shown by a solid line corresponding to a brake fluid pressure characteristic curve a-b-c in FIG. 5, a conventional hydraulic brake system employs a brake fluid control valve through which the rear-wheel brake fluid pressure $P_R$ is set to a lower level over a wide range across a preset point b (a preset brake fluid pressure $P_{S1}$) of the ideal brake fluid pressure distribution characteristic curve indicated by the above noted broken line. The point b corresponds to a particular point across which a brake fluid pressure distribution between front and rear wheels is essentially varied. As appreciated from the brake fluid pressure characteristic curve a-b-c in FIG. 5, the conventional fluid pressure control valve controls the brake fluid pressure distribution between front and rear wheels such that the rear-wheel brake fluid pressure $P_R$ is set essentially at the same value as the front-wheel brake fluid pressure $P_F$ in a relatively low fluid pressure range from a to b and held substantially constant at a lower level than the front-wheel brake fluid pressure in a relatively high fluid pressure, range from b to c. The point b is in general referred to as a "split point". A fluid pressure $P_{S1}$ corresponding to the split point b is referred to as a "critical brake fluid pressure". As shown in FIG. 5, in a relatively high fluid pressure range exceeding the split point b, the rear-wheel brake fluid pressure $P_R$ is set at a lower pressure than the front-wheel brake fluid pressure $P_F$, so as to avoid vehicle spin during braking on hard turns. In other words, the brake fluid pressures in the front and rear wheel-cylinders are set such that the front wheel lock gets priority over the rear wheel lock to avoid oversteer tendencies of the vehicle during braking on turns.

However, in such a conventional hydraulic brake system achieving braking control according to the brake fluid pressure characteristic curve a-b-c, if the brakes are moderately applied to vehicle wheels when the vehicle turns with a relatively large lateral acceleration exerted on the vehicle body, the car weight is shifted to the front wheels. Since neither front nor rear wheels reach a locking condition due to such moderate braking action, cornering force created at the front wheels is increased, whereas cornering force created at the rear wheels is decreased, thereby resulting in oversteer during moderate braking operations on hard turns. On the other hand, in the conventional hydraulic brake system having the brake fluid pressure characteristics a-b-c, if the brakes are quickly applied to vehicle wheels during hard turn, the vehicle may experience front-end skid because the front wheels are first locked due to the front-wheel brake fluid pressure $P_F$ being set to a higher level than the rear-wheel brake fluid pressure $P_R$. There is then a tendency for understeer to occur during hard braking on a severe turn.

SUMMARY OF THE INVENTION

It is, therefore, in view of the above disadvantages, an object of the present invention to provide a brake control system for an automotive vehicle which can avoid oversteer of the vehicle even if the brakes are moderately applied to vehicle wheels when the vehicle turns with a relatively large lateral acceleration exerted on the vehicle body.

It is another object of the invention to provide a brake control system for an automotive vehicle which can provide optimal distribution of braking forces between left and right wheels in response to the degree of turn of the vehicle.

It is a further object of the invention to provide a brake control system for an automotive vehicle which can reduce understeer of the vehicle even if the brakes are quickly applied to vehicle wheels during hard, or sharp, turning.

It is a still further object of the invention to provide a brake control system for an automotive vehicle which can provide optimal brake fluid pressure distribution between left and right wheel-cylinders in relation to shifting of vehicle weight.

In order to accomplish the aforementioned and other objects, a control system for distributing braking forces applied to left and right wheels in an automotive vehicle, comprising a first fluid pressure control valve for normally controlling a left-wheel brake fluid pressure distribution between front and rear-left wheels such that a rear-left wheel brake fluid pressure is less than a front wheel brake fluid pressure in a range above a first critical fluid pressure at which the brake fluid pressure distribution between the front and rear-left wheels is essentially varied, a second fluid pressure control valve for controlling a right-wheel brake fluid pressure distribution for front and rear-right wheels such that a rear-right wheel brake fluid pressure is less than a front wheel brake fluid pressure in a range above a second critical fluid pressure at which the brake fluid pressure distribution between the front and rear-right wheels is essentially varied, means for monitoring whether the vehicle turns, to generate a signal representative of a turning state of the vehicle, and means for varying the first and second critical fluid pressures independently of each other in response to the signal representative of the turning state of the vehicle during turns of the vehicle such that the critical fluid pressure of the outer-wheel side is set at a higher level than the critical fluid pressure of the inner-wheel side.

The turning state monitoring means includes means for detecting a degree of turn of the vehicle, the critical fluid pressure varying means varies the first and second critical fluid pressures independently of each other in dependence on the degree of turn detected by the detecting means. The detecting means for the degree of turn includes a lateral acceleration sensor for monitoring a lateral acceleration of the vehicle body to generate a signal representative of the lateral acceleration, the detecting means determining the degree of turn on the basis of the signal from the lateral acceleration sensor. A pressure difference between the first and second critical fluid pressures is varied in dependence on the degree of turn. The pressure difference may be preferably increased in proportion to the degree of turn.

The previously noted control system of the invention may further comprise means for deriving a magnitude of braking force of the vehicle to generate a signal representative of the magnitude of braking force, the critical fluid pressure varying means varies the first and second critical fluid pressures independently of each other in response to the signal representative of the magnitude of braking force, such that the first and second critical fluid pressures are both increased in accordance with an increase in the braking force. Preferably, the critical fluid pressure varying means varies the first and second critical fluid pressures independently of each other linearly in proportion to the magnitude of braking force. The means for deriving the magnitude of braking force may include a longitudinal acceleration sensor for monitoring a longitudinal acceleration of the vehicle body to generate a signal representative of the longitudinal acceleration. The deriving means determines the magnitude of braking force on the basis of the signal from the longitudinal acceleration sensor.

DESCRIPTION OF THE PREFERRED EMBODIMENTS

Figure 1:
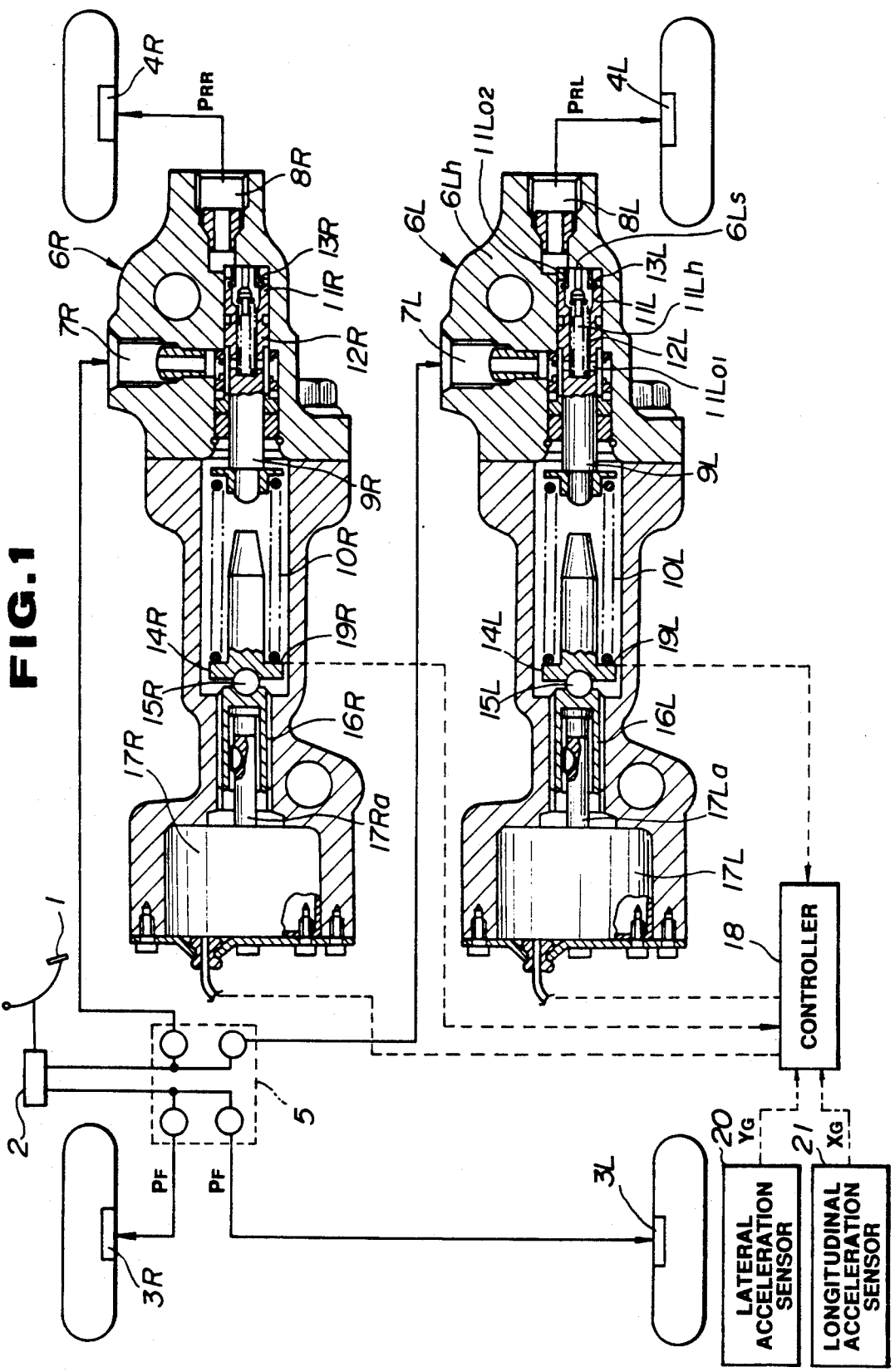
FIG. 1 is a schematic piping arrangement illustrating a preferred embodiment of an automotive brake control system for distributing braking forces applied to vehicle wheels.

Referring now to the drawings, particularly to FIG. 1, a brake control system according to the present invention comprises a tandem master cylinder 2 with two pistons (not shown) set in tandem and front-left, front-rear, rear-left and rear-right wheel-cylinders 3L, 3R, 4L and 4R. The master cylinder 2 generates fluid pressure proportional to a depressing force applied on a brake pedal 1. A master-cylinder fluid pressure forced by a first piston in the cylinder 2 is supplied through a first outlet of the cylinder 2 to both front wheel-cylinders 3L and 3R as a brake fluid pressure $P_F$ for front wheel-cylinders, while the other master-cylinder fluid pressure forced by a second piston of the cylinder 2 is supplied through a second outlet of the cylinder 2 and fluid pressure control valves 6L and 6R (as described in detail herebelow) to both rear wheel-cylinders 4L and 4R as brake fluid pressures $P_{RL}$ and $P_RR$ in rear wheel-cylinders. Recently, a well-known 4-channel anti-skid brake control unit 5 is often provided to control the brake fluid pressures $P_F$, $P_{RL}$ and $P_{RR}$ in the wheel-cylinders 3L, 3R, 4L and 4R, independently of each other, so as to prevent wheel lock.

In a rear-wheel brake fluid system, the brake control system of the present invention also includes two brake fluid pressure control valves 6L and 6R, respectively acting as well-known proportioning valves as disclosed in Japanese First Publication Tokkai (Showa) 61-238554. Since the fluid pressure control valves 6L and 6R have the same construction, only one control valve 6L will be detailed hereinbelow for the purpose of simplification of the disclosure. The fluid pressure control valve 6L receives the fluid pressure from the second outlet of the cylinder 2 through an inlet port 7L and outputs an adjusted fluid pressure serving as the brake fluid pressure $P_{RL}$ through an outlet port 8L to the rear-left wheel-cylinder 4L. Although it is not clearly shown, the fluid pressure control valve 6L includes a substantially cylindrical stepped plunger 9L slidably disposed in a cylindrical hollow defined in its valve housing 6L$h$, a return spring 10L biasing the plunger 9L towards a rightmost position (viewing FIG. 1) wherein a poppet valve seat 13L attached to the right end of the plunger mates with a shoulder 6L$s$ of the housing 6L$h$, a poppet valve 11L$h$ slidably enclosed in a cylindrical hollow 11L bored in the plunger 9L, and a return spring 12L. operably enclosed in the hollow 11L for biasing the poppet vave 11L$h$ rightwards. The plunger also includes a first opening 11L$o$1 formed in the small diameter secton and a second opening 11L$o$2 formed in the valve seat 13L. As seen in FIG. 1, the inlet port 7L is communicated through the first opening 11L$o$1, the hollow 11L and the second opening 11L$o$2 with the outlet port 8L.

Figure 5:
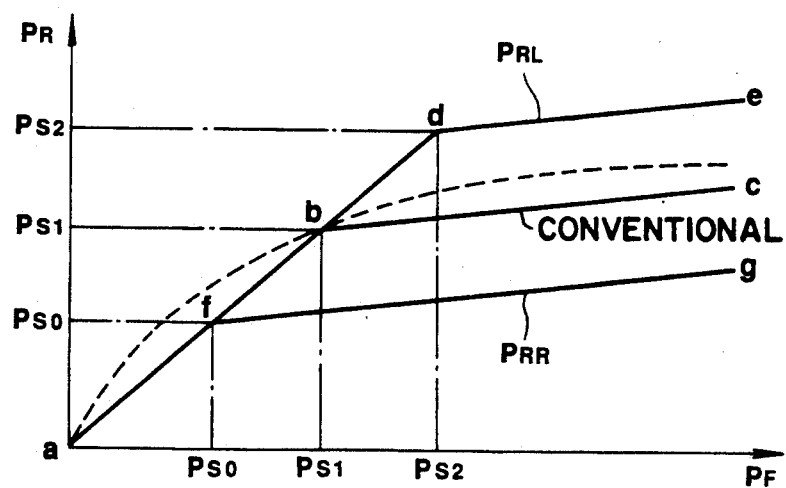
FIG. 5 is a graph illustrating pressure distribution characteristics of fluid pressures in front and rear wheel-cylinders activated by the brake control system according to the invention.

In the rightmost position of the plunger 9L as shown in FIG. 1, the right end of the poppet valve 11L$h$ is pushed back by the shoulder 6L$s$ and therefore the poppet valve is slightly moved in a left direction while compressing the return spring 12L. As a result, the poppet valve separates from the valve seat 13L and thus the poppet valve is maintained in the open position. Under this condition, the two ports 7L and 8L are communicated to each other and thus the brake fluid pressure $P_{RL}$ in the rear-left wheel-cylinder 4L becomes equal to the master-cylinder fluid pressure (corresponding to the brake fluid pressure $P_F$ in the front wheel-cylinders) fed through the second outlet of cylinder 2. The above noted state of the fluid pressure control valve 6L occurs in a relatively low pressure range wherein the master-cylinder fluid pressure does not reach a critical brake fluid pressure $P_{S1}$ (determined by a set spring force of the return spring 10L) as seen in FIG. 5. In this state, a brake fluid pressure distribution between the front and rear wheel-cylinders is varied in accordance with the fluid pressure characteristic curve a-b of FIG. 5, while keeping the pressure relationship of $P_F = P_{RL}$.

The plunger 9L moves against the return spring 10L in the left direction in accordance with an increase in the master-cylinder fluid pressure. On the other hand, the poppet valve 11L mates with the valve seat 13L by means of the return spring 12L when the master-cylinder fluid pressure is gradually increased and reaches the critical fluid pressure $P_{S1}$. Thus, the poppet valve 11Lh becomes closed. In the poppet-valve closed state, the poppet valve blocks a communication between the inlet port 7L and the outlet port 8L. Therefore, a rate of the brake fluid pressure-rise in the rear-left wheel-cylinder 4L does not become equivalent to that of the master-cylinder fluid pressure-rise, but becomes restricted at a lower level than the rate of the master-cylinder fluid pressure-rise. Under the poppet valve closed state, when the master-cylinder fluid pressure is subsequently increased at a higher level than the critical fluid pressure $P_{S1}$, the subsequent pressure-rise varies a balance between two forces, one being a force pushing the plunger 9L in the left direction (viewing FIG. 1), caused by the rear-left wheel-cylinder brake fluid pressure $P_{RL}$ applied to the rightmost end of the plunger 9L and the other being a force pushing the plunger 9L in the right direction, caused by the master-cylinder fluid pressure $P_F$ applied to the stepped section of the plunger. For this reason, when the subsequent master-cylinder fluid pressure-rise reaches a given degree of the pressure-rise, the previously noted force balance is destroyed and as a result the plunger 9L moves rightwards. Thus, the poppet valve returns in the open state and the rear-left wheel-cylinder brake fluid pressure $P_{RL}$ is increased again. Thereafter, the plunger 9L is moved leftwards due to the increased fluid pressure $P_{RL}$ and as a result the poppet valve 11Lh becomes kept in the closed state. In this manner, when the master-cylinder fluid pressure reaches the critical fluid pressure $P_{S1}$ and subsequently increased, the brake fluid pressure $P_{RL}$ is increased at a lower rate than the rate of the master-cylinder fluid pressure-rise, while alternatively repeating the opening and closed states of the poppet valve 11Lh. In such a pressure range when the master-cylinder fluid pressure exceeds the critical fluid pressure $P_{S1}$ or the split point b, the brake fluid pressure distribution is varied in accordance with the fluid pressure characteristic curve b-c of FIG. 5. That is, the pressure-rise rate of the rear-left wheel-cylinder brake fluid pressure $P_{RL}$ is restricted in comparison with the master-cylinder fluid pressure (the front brake fluid pressure $P_F$) As seen in FIG. 1, the fluid pressure control valves 6L and 6R exhibit the fluid pressure control characteristics (as seen in the solid line a-b-c of FIG. 5) substantially asymptotic to the ideal brake fluid pressure distribution characteristic curve indicated by the broken line.

The fluid pressure control valve employed in the brake control system according to the invention is different from the conventional fluid flow control valve disclosed in the Japanese First Publication Tokkai (Showa) 61-238554, in that the set spring forces of the return springs 10L and 10R are variable and consequently the critical fluid pressure $P_{S1}$ (the split point b) is variable. For this reason, the fluid pressure control valve utilized in the improved brake control system of the present invention includes means for changing a critical fluid pressure (a split point of a brake fluid pressure distribution characteristic curve). The split point changing means comprises an axially movable valve seat 14L supporting one end of the return spring 10L, faced away from the left end of the plunger 9L, an axially movable screw 16L being in contact with the valve seat 14L through a ball 15L, and a reversible motor or rotary solenoid 17L having a driving connection with the screw 16L through its output shaft 17La so as to achieve an axial movement of the screw 16L. Both an amount and a direction required for driving the screw 16L are controlled by a controller 18 described hereinbelow in detail. The controller 18 receives various signals generated from set force sensors 19L and 19R, respectively monitoring set spring forces of the springs 10L and 10R, a lateral acceleration sensor 20 monitoring a lateral acceleration $Y_G$ of the vehicle body, and a longitudinal acceleration sensor 21 monitoring a longitudinal acceleration $X_G$ of the vehicle body. Since a magnitude of the lateral acceleration $Y_G$ is correlated with a degree of turn of the vehicle, the degree of turn is determined on the basis of the lateral acceleration $Y_G$. Furthermore, since a magnitude of the longitudinal acceleration $X_G$ is correlated to a magnitude of a braking force acting to the vehicle, the braking force is determined on the basis of the longitudinal acceleration $X_G$. The controller, 18 is comprised of two control circuits, namely a left control circuit for controlling the motor 17L employed in the fluid pressure control valve 6L on the basis of the input information from the sensors 19L, 19R, 20 and 21 and another right control circuit for controlling the motor 17R employed in the fluid pressure control valve 6R. Since the right control circuit is the same construction as the left control circuit, only the construction of one control circuit within controller 18 will be hereinbelow described in detail in accordance with the circuit diagram of FIG. 2.

Figure 2:
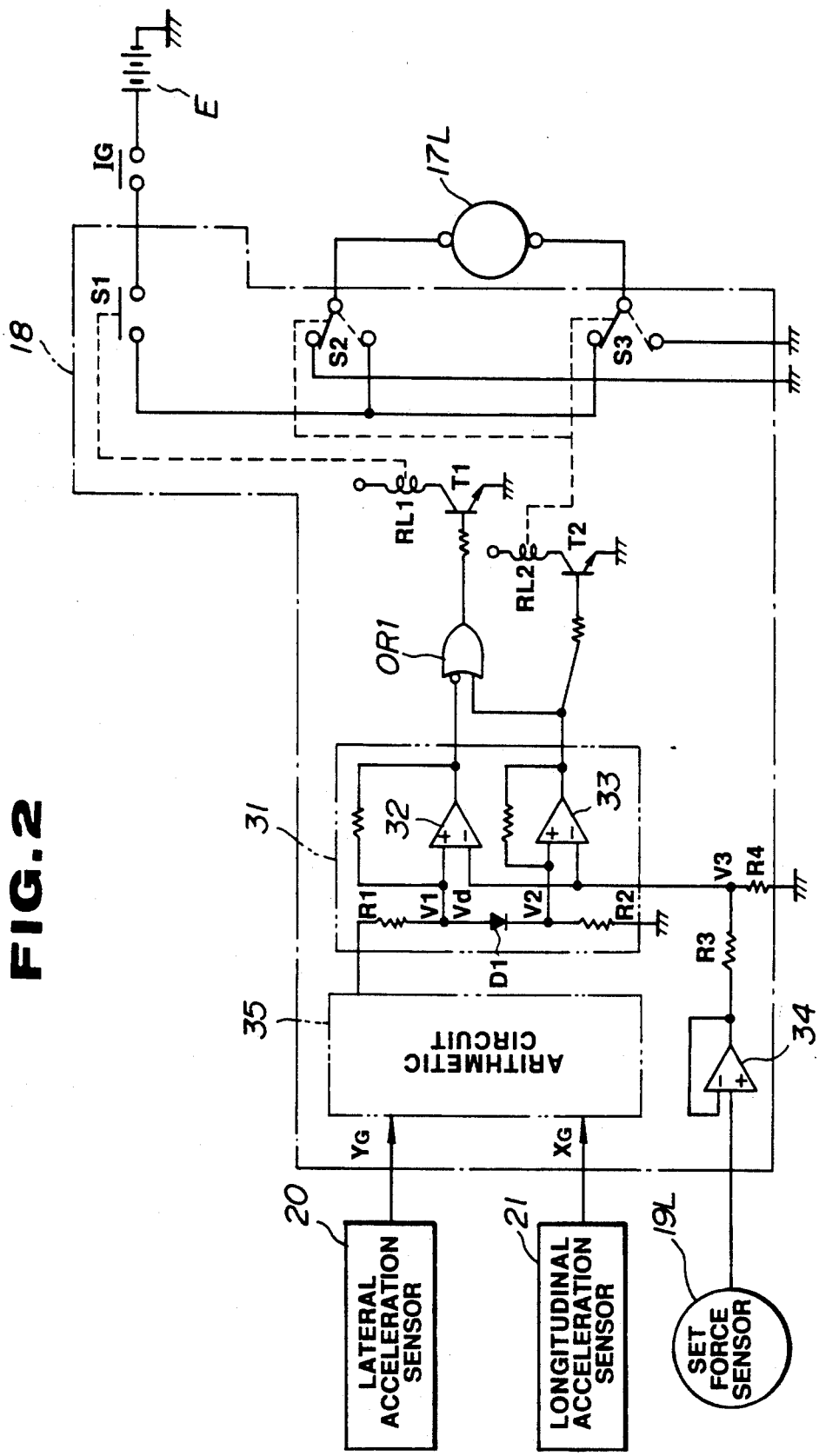
FIG. 2 is a circuit diagram illustrating a control circuit for activating a fluid pressure control valve disposed in the brake control system of FIG. 1 to control fluid pressures in left wheel-cylinders.

Referring now to FIG. 2, one terminal of the motor 17L is connected to controller 18 through a switching section S2 of an electromagnetic relay, a switching section S1 of an electromagnetic relay and an ignition switch IG to a positive terminal of a car battery E, in that order. On the other hand, the other terminal of the motor 17L is connected through a switching section S3 of an electromagnetic relay, the switching section S1 and the ignition switch IG to the plus terminal of the car battery E, in that order. As appreciated from FIG. 2, both switching sections S2 and S3 are provided to switch the rotational direction of the motor. The switching section S1 is a normally open type switch which is closed only when an exciting coil RL1 is excited. The respective switching sections S2 and S3 are shifted from first positions indicated by solid lines to second positions indicated by broken lines so as to change a flow direction of current flowing through the motor and consequently to reverse the rotational direction of the motor only when an exciting coil RL2 is excited. One terminal of each exciting coil RL1 and RL2 is connected to the positive terminal of the battery E, whereas the other terminal of each exciting coil is grounded through a collector-emitter of each transistor T1 and T2. A base of the transistor T1 is connected to an output terminal of an OR gate OR1, while both a base of the transistor T2 and two input terminals of the OR gate are connected to a comparing circuit 31.

The comparing circuit 31 comprises two comparators 32 and 33, two resistances R1 and R2, and a diode D1. The resistances R1 and R2 are arranged in series with each other in a manner so as to sandwich the diode D1 between the resistances R1 and R2, as seen in FIG. 2. A line between the resistance R1 and the diode D1 is connected to the positive input terminal of the comparator 32, while a line between the resistance R2 and the diode D1 is connected to the positive input terminal of the comparator 33. The other end of the resistance R2 is grounded. Both negative input terminals of the comparators 32 and 33 are connected to an intermediate line between two resistances R3 and R4. The other end of the resistance R4 is grounded.

The resistance R3 is connected through an amplifier 34 to the set force sensor 19L to receive a voltage according to a magnitude of a currently set force of the return spring 10L. On the other hand, the resistance R1 receives an output voltage according to a desired target critical fluid pressure for the fluid pressure control valve 6L for the rear-left wheel-cylinder 4L. The output voltage is generated by an arithmetic circuit 35 which derives the target critical fluid pressure to be set in the fluid pressure control valve 6L on the basis of the signals from the lateral acceleration sensor 20 and the longitudinal acceleration sensor 21. The output voltage from the arithmetic circuit 35 is divided by the resistances R1 and R2 in such a manner as to apply two different voltages V1 and V2 to the respective positive input terminals of the comparators 32 and 33. The voltages V1 and V2 respectively correspond to upper and lower limits of a controllable voltage required to determine a desired set force of the return spring 10L, necessary to set the desired target critical fluid pressure for the fluid pressure control valve 6L. The voltage V2 impressed on the positive input terminal of the comparator 33 is set at a lower level than the voltage V1 impressed on the positive input terminal of the comparator 32 such that the voltage V2 is offset from the voltage V1 by a voltage difference Vd corresponding to a hysteresis which is created by the diode D1 disposed between the resistances R1 and R2 so as to provide an acceptable voltage difference required for the comparison between the voltage V3 representative of the current critical fluid pressure actually monitored by the sensor 19L and the controllable voltage necessary to newly set the target critical fluid pressure. Thereafter, the voltages V1 and V2 are respectively compared with the voltage V3 by means of the comparators 32 and 33. The previously noted arithmetic circuit 35 basically derives the target critical fluid pressure $P_{SL}$ to be set in the fluid pressure control valve 6L in accordance with a data map shown in FIG. 3 or an equation $P_{SL} = P_{S1} + BY_G$, wherein $P_{S1}$ is a reference critical fluid pressure for the fluid pressure control valve 6L, B is a given gain and $Y_G$ is the previously described lateral acceleration.

Figure 3:
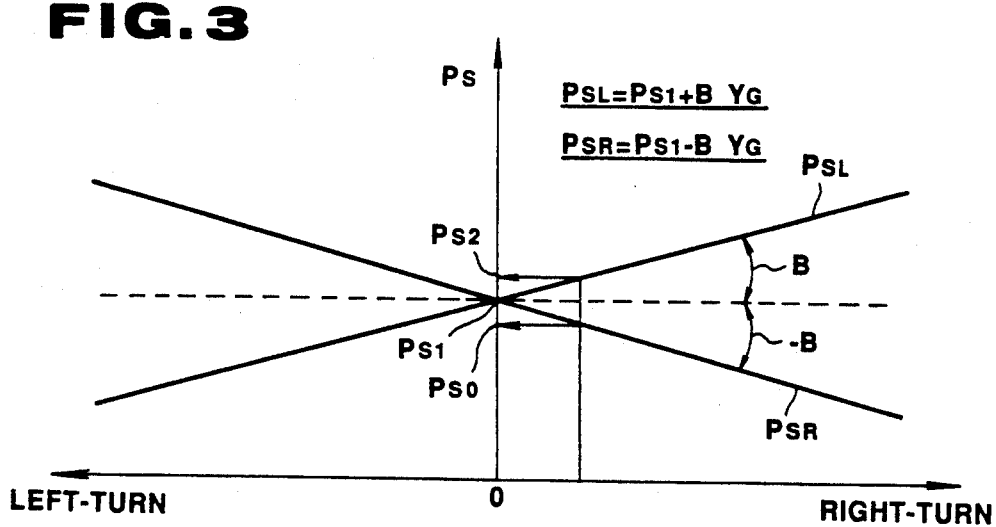
FIG. 3 is a graph illustrating control characteristics of a target critical fluid pressure in the fluid pressure control valve.

Likewise, the target critical fluid pressure $P_{SR}$ to be set in the fluid pressure control valve 6R is also derived by the same arithmetic circuit as the circuit 35 in accordance with the data map of FIG. 3 or an equation $P_{SR} = P_{S1} - BY_G$.

As appreciated from FIG. 3, in the brake control system according to the invention, both of the critical fluid pressures $P_{SL}$ and $P_{SR}$ are varied in response to various turning conditions of the vehicle. When the vehicle travels straight, that is, the lateral acceleration $Y_G$ is maintained 0, both target critical fluid pressures $P_{SL}$ and $P_{SR}$ are set to the reference critical fluid pressure $P_{S1}$ and as a result the fluid pressure control characteristics of the valves 6L and 6R are varied in accordance with the solid line a-b-c (of FIG. 5) substantially asymptotic to the ideal brake fluid pressure distribution characteristic curve seen in FIG. 5. On the other hand, when the vehicle turns rightward or leftward, both target critical fluid pressures $P_{SL}$ and $P_{SR}$ are varied in dependence on a degree of turn of the vehicle and its turning direction such that the target critical fluid pressure to the fluid pressure control valve acting for the outer wheel is increased in proportion to the degree of the vehicle turn and the target critical fluid pressure to the fluid pressure control valve acting for the inner wheel is decreased in reverse proportion to the degree of vehicle turning. For example, during a right turn, the target critical fluid pressure $P_{SL}$ to be set in the fluid pressure control valve 6L for the rear-left wheel-cylinder 4L is increased, while the target critical fluid pressure $P_{SR}$ to be set in the fluid pressure control valve 6R for the rear-right wheel-cylinder 4R is decreased. FIG. 5 shows a target critical fluid pressure relationship between the fluid pressure control valves 6L and 6R during a right turn.

Returning to FIG. 2, the comparing circuit 31, the OR gate OR1 and the transistors T1 and T2 operate as follows.

As set forth above, the arithmetic circuit 35 determines a target critical fluid pressure $P_{SL}$. For example, during a right turn, the target critical fluid pressure $P_{SL}$ is set to a greater fluid pressure $P_{S2}$ than the reference critical fluid pressure $P_{S1}$ as seen in FIG. 3. In response to the pressure $P_{S2}$, the voltages V1 and V2 are applied to the respective positive terminals of the comparators 32 and 33. The OR gate OR1 acts in conjunction with the comparators 32 and 33 to turn OFF the transistors T1 and T2 when the voltage V3 is equal to or less than the voltage V1 and is equal to or greater than the voltage V2, that is, $V2 \leq V3 \leq V1$ =wherein the current critical fluid pressure is substantially equal to the target critical fluid pressure. Under this condition, since the current critical fluid pressure is essentially equivalent to the target critical fluid pressure, the turned-OFF transistor T1 acts to maintain the switching section S1 in its open state and the turned-OFF transistor T2 acts to maintain the switching sections S2 and S3 in the positions indicated by the solid lines of FIG. 2. As a result, the motor 17L is deactivated so as to retain the set force of the return spring 10L (consequently the critical fluid pressure or the split point) unchanged.

When the voltage V3 is less than the voltage V2 (V3<V2), that is, the current critical fluid pressure is less than the target critical fluid pressure, the OR gate OR1 operates in conjunction with the comparators 32 and 33 to turn ON the transistors T1 and T2 such that the switching section S1 becomes kept in a closed state and the switching sections S2 and S3 are shifted to the positions indicated by the broken lines of FIG. 2. As a result, the motor 17L is driven in a normal rotational direction until the current critical fluid flow pressure is gradually increased and reaches the target critical fluid pressure while increasing the set force of the spring 10L.

When the voltage V3 exceeds the voltage V1 (V3>V1), that is, the current critical fluid pressure is greater than the target critical fluid pressure, the OR gate OR1 operates in conjunction with the comparators 32 and 33 to turn ON the transistor T1 and to turn OFF the transistor T2 such that the switching section S1 becomes kept in a closed state and the switching sections S2 and S3 are maintained in the positions indicated by the solid lines of FIG. 2. As a result, the motor 17L is driven in a reverse rotational direction until the current critical fluid flow pressure is gradually decreased and reaches the target critical fluid pressure while decreasing the set force of the spring 10L.

The target critical fluid pressure $P_{SR}$ set in the fluid pressure control valve 6R for the rear-right wheel-cylinder 4R, is also determined in the same manner described previously. For example, during a right turn, the target critical fluid pressure $P_{SR}$ is set to a lower fluid pressure $P_{S0}$ than the reference critical fluid pressure $P_{S1}$ as seen in FIG. 3. In response to the set target critical fluid pressure $P_{S0}$, the motor 17R employed in the fluid pressure control valve 6R is suitably driven so as to approach the current critical fluid pressure actually monitored by the sensor 19R to the target critical fluid pressure.

As set forth above, the target critical fluid pressures $P_{SL}$ and $P_{SR}$ are adjusted as seen in FIG. 3 such that the target critical fluid pressures $P_{SL}$ and $P_{SR}$ are both set to the reference critical fluid pressure $P_{S1}$ during a straight-ahead driving, and respectively set to a higher fluid pressure $P_{S2}$ and to a less fluid pressure $P_{S0}$ when compared to the reference critical fluid pressure $P_{S1}$, during a right-hand turn, for instance. In order to achieve the above noted critical fluid pressure independent shifting control wherein critical fluid pressures in right-wheel and left-wheel cylinders are controlled independently of each other, the brake fluid pressure distribution characteristics in front and rear wheel-cylinders are controlled as follows.

During straight-ahead driving, the brake fluid pressure distribution characteristics are controlled to vary in accordance with the characteristic curve a-b-c indicated by the solid line of FIG. 5 with regard to both rear-left and rear-right wheel cylinders 4L and 4R. Coversely, on turns, the brake fluid pressure distribution characteristics are respectively controlled to vary in accordance with the characteristic curve a-d-e with regard to the outer wheel side of the rear wheel-cylinder, and in addition to vary in accordance with the characterisitc curve a-f-g with regard to the inner wheel side of the rear wheel-cylinder. For example, during a right turn, the rear-left wheel-cylinder brake fluid pressure $P_{RL}$ is controlled to vary in accordance with the characteristic curve a-d-e, while the rear-right wheel-cylinder brake fluid pressure $P_{RR}$ is controlled to vary in accordance with the characteristic curve a-f-g.

According to the above described critical fluid pressure independent shifting control achieved by the brake control system of the invention, the vehicle experiences a yawing moment created by the pressure difference between the rear-left and rear-right brake fluid pressures $P_{RL}$ and $P_{RR}$ (consequently a braking force difference between the rear-left and rear-right wheels) in order to eliminate oversteer occurring due to moderate braking action when the vehicle turns with a relatively large lateral acceleration. As a result, the vehicle can safely travel along an acceptable turning locus even when the hard turning is executed with a relatively large lateral acceleration.

In the aforementioned preferred embodiment, since the critical fluid pressure difference between the rear-left and rear-right wheel-cylinders i.e., the braking force difference between the rear-left and rear-right wheels is controlled essentially in proportion to the magnitude of the lateral acceleration $Y_G$, as seen in FIG. 3, the braking force difference can be suitably adjusted in response to the degree of turn of the vehicle, so as to assure an optimal turning locus for the vehicle. The lateral acceleration $Y_G$ representing the degree of the vehicle turn may be replaced with a yaw rate of the vehicle, a steering angle, a wheel speed difference between right and left vehicle wheels, or the like.

Figure 4:
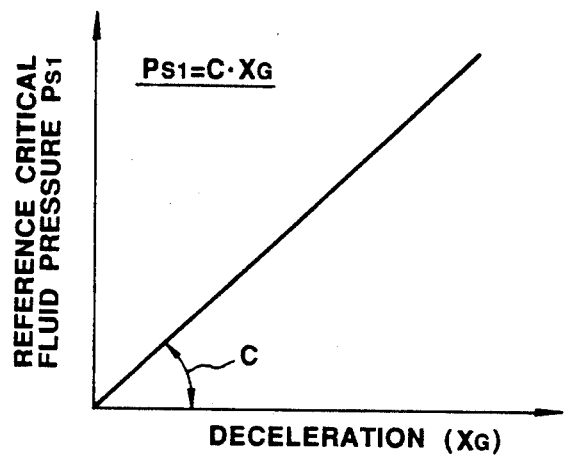
FIG. 4 is a graph illustrating a relationship between a decceleration $X_G$ of a vehicle and an initial value $P_{S1}$ of a target critical fluid pressure $P_S$.

Referring now to FIG. 4, a second embodiment of the brake control system according to the invention further comprises means for changing an initially set value $P_{S1}$ of a critical fluid pressure in dependence on a deceleration $X_G$ monitored by the longitudinal acceleration sensor 21 shown in FIGS. 1 and 2. In the second embodiment, the initial value $P_{S1}$ is varied in proportion to the deceleration $X_G$ with a proportional constant C, that is, in accordance with a straight line represented by an equation $P_{S1} = CX_G$. Therefore, according to the second embodiment, the critical fluid pressure characteristics seen in FIG. 3 are entirely set at a higher level in response to a magnitude of the increased deceleration. According to the second embodiment, during hard braking on turns, both split points, i.e., critical fluid pressures in left and right wheel-cylinders are set at a higher level than the ideal brake fluid pressure distribution characteristic curve of FIG. 5, while executing the previously described critical fluid pressure independent shifting control. This reduces understeer of the vehicle during quick braking on turns.

Although the longitudinal acceleration sensor 21 detecting the longitudinal acceleration $X_G$ is used as a deceleration sensor, the longitudinal acceleration sensor is replaced with a sensor for monitoring an output brake fluid pressure from the master-cylinder 2 or a sensor for monitoring a depressing force of the brake-pedal.

As appreciated from the above, the brake control system according to the invention can eliminate oversteer during moderate braking on turns and in addition reduce understeer during quick braking on turns, so as to achieve an ideal neutral-steer. That is, on turns, since the brake control system according to the invention controls critical fluid pressures, i.e., split points to fluid pressure control valves for outer and inner wheels independently of each other in such a manner as to set the split point of the outer-wheel side at a higher level than the inner-wheel side, the brake control system of the invention can provide the braking force difference between the left and right wheels occurs so as to generate a yawing moment required to eliminate oversteer during moderate braking on turns. Since the magnitude of the braking force difference is suitably varied in dependence on the degree of turn, the brake control system of the invention can reliably eliminate oversteer occurring during moderate braking on turns, irrespective of the degree of turn. Furthermore, since the outer-wheel side of braking force is enhanced rather than the inner-wheel side due to the braking force difference between the right and left wheels depended on the degree of turn and due to a load shift occurring when the car weight is shifted to the outer-wheel side on turns, a braking efficiency is enhanced to reduce a brake stopping distance of the vehicle. Moreover, according to the second embodiment, since the initially set value of the critical fluid pressure of the fluid pressure control valve is increased in proportion to the magnitude of braking force, the operation of the fluid pressure control valve is retarded during quick braking. This results in a tendency for a rear-wheel lock, i.e., rear-end skid rather than a front-wheel lock during quick braking on turns. The rear-wheel lock compensates understeer occurring due to the previously described front-end skid during quick braking on turns.

While the foregoing is a description of the preferred embodiments for carrying out the invention, it will be understood that the invention is not limited to the particular embodiment shown and described herein, but may include variations and modifications without departing from the scope or spirit of this invention as described by the following claims.

What is claimed is:

1. A control system for distributing braking forces applied to left and right wheels in an automotive vehicle, comprising:
   a first fluid pressure control valve for controlling left-wheel brake fluid pressure distribution between front-left and rear-left wheels such that rear-left wheel brake fluid pressure is reduced by a designated ratio when compared with front-left wheel brake fluid pressure in a range above a first critical fluid pressure at which said brake fluid pressure distribution between said front-left and rear-left wheels is essentially varied, while said rear-left wheel brake fluid pressure is equivalent to said front-left wheel brake fluid pressure in a range below said first critical fluid pressure;
   a second fluid pressure control valve for controlling right-wheel brake fluid pressure distribution for front-right and rear-right wheels such that rear-right wheel brake fluid pressure is reduced by a designated ratio when compared with front-right wheel brake fluid pressure in a range above a second critical fluid pressure at which said brake fluid pressure distribution between said front-right and rear-right wheels is essentially varied, while said rear-right wheel brake fluid pressure is equivalent to said front-right wheel brake fluid pressure in a range below said second critical fluid pressure;
   means for monitoring whether said vehicle turns to generate a signal representative of a turning state of said vehicle; and
   means for compensating steering characteristics of said vehicle toward neutral steering during braking on turns by varying said first and second critical fluid pressures independently of each other in response to said signal representative of a turning sate of said vehicle such that a critical fluid pressure of an outer-wheel side is set at a higher level than a critical fluid pressure of an inner-wheel side.

2. The control system as set forth in claim 1, wherein:
   said monitoring means includes means for detecting a degree of turn of the vehicle, and
   said means for compensating varying said first and second critical fluid pressures independently of each other in dependence on said degree of turn detected by said detecting means.

3. The control system as set forth in claim 2, wherein said means for detecting said degree of turn includes a lateral acceleration sensor for monitoring lateral acceleration of said vehicle to generate a signal representative of said lateral acceleration, said detecting means determining said degree of turn on the basis of said signal from said lateral acceleration sensor.

4. The control system as set forth in claim 3, wherein a pressure difference between said first and second critical fluid pressures is varied in dependence on said degree of turn.

5. The control system as set forth in claim 4, wherein said pressure difference is increased in proportion to said degree of turn.

6. A control system for distributing braking forces applied to left and right wheels in an automotive vehicle, comprising:
   a first fluid pressure control valve for controlling left-wheel brake fluid pressure distribution between front-left and rear-left wheels, such that rear-left wheel brake fluid pressure is reduced by a designated ratio when compared with front-left wheel brake fluid pressure in a range above a first critical fluid pressure at which said brake fluid pressure distribution between said front-left and rear-left wheels is essentially varied, while said rear-left wheel brake fluid pressure is equivalent to said front-left wheel brake fluid pressure in a range below said first critical fluid pressure;
   a second fluid pressure control valve for controlling right-wheel brake fluid pressure distribution between front-right and rear-right wheels, such that rear-right wheel brake fluid pressure is reduced by a designated ratio when compared with front-right wheel brake fluid pressure in a range above a second critical fluid pressure at which said brake fluid pressure distribution between said front-right and rear-right wheels is essentially varied, while said rear-right wheel brake fluid pressure equivalent to said front-right wheel brake fluid pressure in a range below said second critical fluid pressure;
   means for monitoring whether said vehicle turns to generate a signal representative of a turning state of said vehicle;
   means for deriving a magnitude of braking force of said vehicle to generate a signal representative of said magnitude of braking force; and
   means for compensating steering characteristics of said vehicle toward a neutral steering during braking on turns, by varying said first and second critical fluid pressures independently of each other in response to said signal representative of said turning sate of said vehicle, such that critical fluid pressure of an outer-wheel side is set at a higher level than critical fluid pressure of an inner-wheel side, said means for compensating being responsive to said braking force for additionally increasing both said first and second critical fluid pressures in accordance with an increase in said braking force.

7. The control system as set forth in claim 6, wherein said means for compensating varies said first and second critical fluid pressures independently of each other in linear proportion to said magnitude of braking force.

8. The control system as set forth in claim 6, wherein said means for deriving said magnitude of braking force includes a longitudinal acceleration sensor for monitoring longitudinal acceleration of said vehicle to generate a signal representative of said longitudinal acceleration, said deriving means determining said magnitude of braking force on the basis of said signal from said longitudinal acceleration sensor.

9. A control system for distributing braking forces applied to left and right wheels in an automotive vehicle, comprising:
   a first fluid pressure control valve for controlling left-wheel brake fluid pressure distribution between front-left and rear-left wheels, such that rear-left wheel brake fluid pressure is reduced by a designated ratio when compared with front-left wheel brake fluid pressure in a range above a first critical fluid pressure at which said brake fluid pressure distribution between said front-left and rear-left wheels is essentially varied, while said rear-left wheel brake fluid pressure is equivalent to said front-left wheel brake fluid pressure in a range below said first critical fluid pressure;

a second fluid pressure control valve for controlling right-wheel brake fluid pressure distribution between front-right and rear-right wheels, such that rear-right wheel brake fluid pressure is reduced by a designated ratio when compared with front-right wheel brake fluid pressure in a range above a second critical fluid pressure at which said brake fluid pressure distribution between said front-right and rear-right wheels is essentially varied, while said rear-right wheel brake fluid pressure is equivalent to said front-right wheel brake fluid pressure in a range below said second critical fluid pressure;

means for detecting a degree of turn of said vehicle;

means for deriving a magnitude of braking force of said vehicle to generate a signal representative of said magnitude of braking force; and means for compensating steering characteristics of said vehicle towards neutral steering during braking on turns, by varying said first and second critical fluid pressures independently of each other in accordance with said degree of turn, such that a critical fluid pressure of an outer-wheel side is set at a higher level than a critical fluid pressure of an inner-wheel side with a given ratio proportional to said degree of turn so as to eliminate oversteering tendencies occurring due to light braking on turns, and both of said first and second critical fluid pressures are additionally increased in accordance with an increase in said magnitude of braking force with a given increasing ratio so as to eliminate understeering tendencies occurring due to hard braking on turns.

* * * * *